United States Patent [19]

Nakajima et al.

[11] Patent Number: 4,459,804
[45] Date of Patent: Jul. 17, 1984

[54] MULTIPLE SPARK IGNITION INTERNAL COMBUSTION ENGINE WITH EXHAUST GAS RECIRCULATION

[75] Inventors: Yasuo Nakajima, Yokosuka; Yoshimasa Hayashi, Yokohama; Tooru Yoshimura, Yokosuka, all of Japan

[73] Assignee: Nissan Motor Company, Limited, Yokohama, Japan

[21] Appl. No.: 289,691

[22] Filed: Aug. 3, 1981

Related U.S. Application Data

[63] Continuation of Ser. No. 41,989, May 24, 1979, abandoned, and a continuation-in-part of Ser. No. 815,449, Jul. 13, 1977, abandoned, said Ser. No. 41,989, is a continuation of Ser. No. 873,666, Jan. 30, 1978, abandoned, which is a continuation-in-part of Ser. No. 790,878, Apr. 26, 1977, abandoned, which is a continuation of Ser. No. 649,231, Jan. 15, 1976, abandoned, said Ser. No. 815,449, is a continuation-in-part of Ser. No. 790,878.

[30] Foreign Application Priority Data

Jan. 22, 1975 [JP] Japan ................................. 50-9454

[51] Int. Cl.$^3$ .................... F02M 25/06; F02P 15/02
[52] U.S. Cl. ...................................... 60/274; 60/278; 123/310; 123/568; 123/638
[58] Field of Search ............... 60/274, 278; 123/568, 123/640, 638, 310

[56] References Cited

U.S. PATENT DOCUMENTS

| | | | |
|---|---|---|---|
| 2,469,448 | 5/1949 | Barber | 123/301 |
| 2,522,921 | 9/1950 | Barkeij | 123/309 |
| 2,576,819 | 11/1951 | Angle | 123/193 H |
| 3,310,045 | 3/1967 | Bartholomew | 123/582 |
| 3,470,857 | 10/1969 | Stivender | 123/568 |
| 3,768,787 | 10/1973 | Marsee | 60/278 |
| 3,791,144 | 2/1974 | Lang | 60/278 |
| 3,820,514 | 6/1974 | Kuehl . | |
| 3,901,203 | 8/1975 | Pozniak | 123/568 |
| 3,929,115 | 12/1975 | Yamauti | 123/310 |

FOREIGN PATENT DOCUMENTS

| | | |
|---|---|---|
| 1601828 | 3/1971 | Fed. Rep. of Germany . |
| 2258514 | 6/1973 | Fed. Rep. of Germany . |
| 2133166 | 11/1972 | France . |
| 2177323 | 11/1973 | France . |
| 2211971 | 7/1974 | France . |
| 48-12481 | 4/1973 | Japan . |
| 48-59221 | 8/1973 | Japan . |
| 1271417 | 4/1972 | United Kingdom . |
| 1361545 | 7/1974 | United Kingdom . |
| 1380046 | 1/1975 | United Kingdom . |
| 1401103 | 7/1975 | United Kingdom . |
| 1418189 | 12/1975 | United Kingdom . |

OTHER PUBLICATIONS

Quader, A. A., "Effects of Spark Location and Combustion Duration on NOx and HC Emissions," SAE Pap. 730153, 3/73, pp. 3–8.
Quader, A. A., "Lean Combustion and the Misfire Limit . . . ", SAE Paper No. 741055, Oct. 1974, Appendix C, pp. 2 and 4.
U.S. Prod. Engr., vol. 46, No. 1, pp. 11–12.
Motortechnische Zeitschrift, vol. 29, No. 9, (1968), pp. 355–365, by Grozinger, entitled "Abgasentgiftung bei Vergasermotoren".
Internal Combustion Engine, vol. 12, No. 145, (1973), "Exhaust Emission Reduction with Lean Mixture (1), —Early Fuel Evaporation Device—".
Journal of the Society of Automotive Engineers, (1966), "A New Look at Nitrogen Oxides Formation in Internal Combustion Engines", by Eyzat and Guibet.
Motortechnische Zeitschrift, vol. 34, No. 1, (pp. 7–11), by Zechnall and Baumann, entitled "Reines Abgas bei Otto–Motoren durch geschlossenen Regelkreis".

Primary Examiner—Douglas Hart
Attorney, Agent, or Firm—Schwartz, Jeffery, Schwaab, Mack, Blumenthal & Koch

[57] ABSTRACT

A spark-ignition internal combustion engine with multiple plugs is operated at an air-fuel ratio around the stoichometric under a high EGR rate higher than EGR limits for stable operation in a single spark plug ignition engine.

35 Claims, 24 Drawing Figures

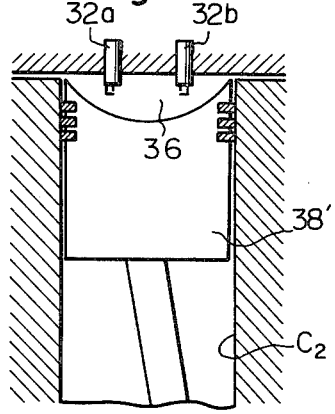
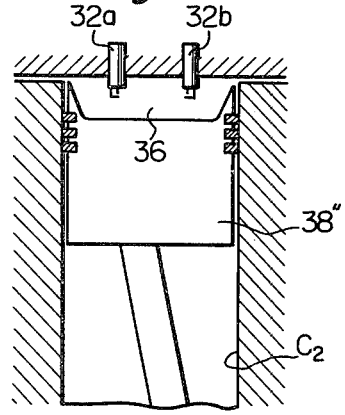
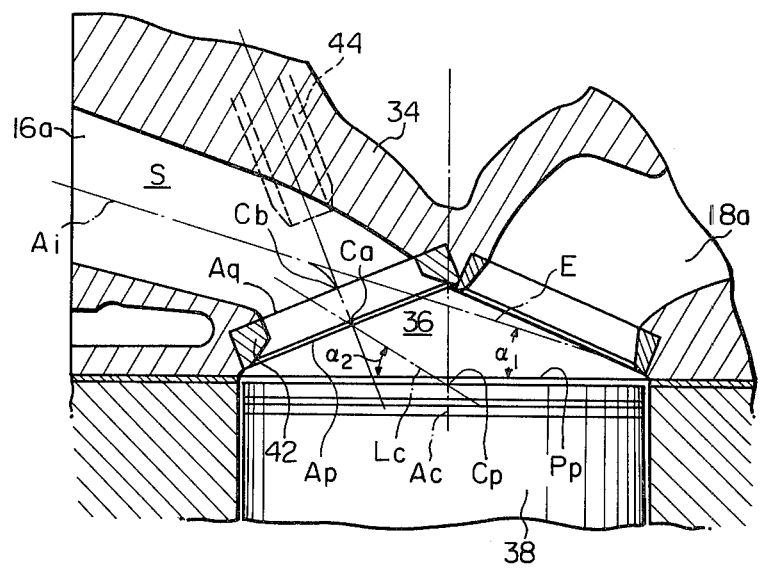

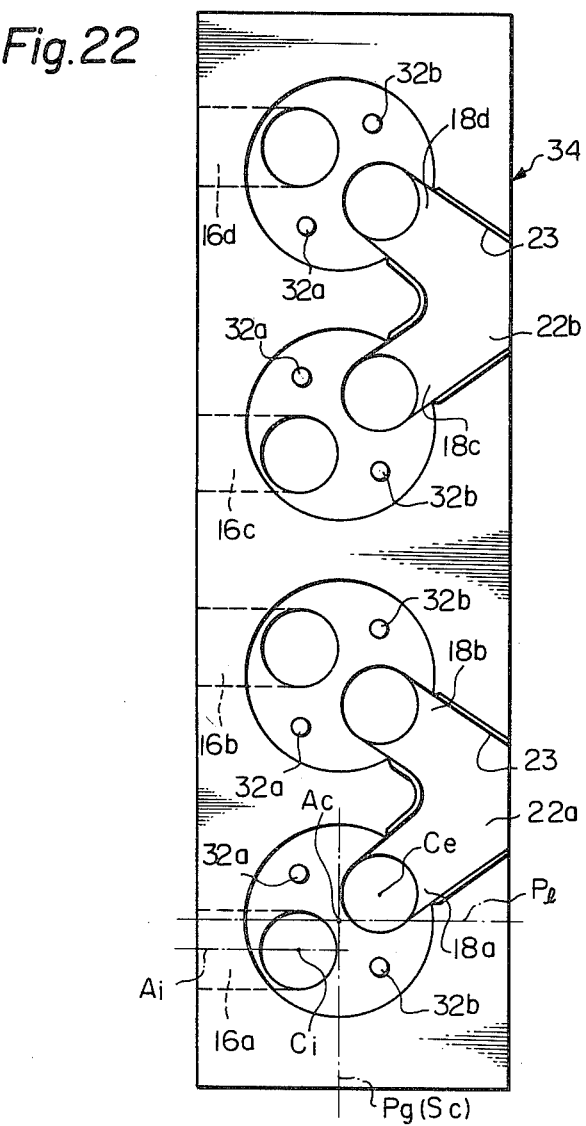

MULTIPLE SPARK IGNITION INTERNAL COMBUSTION ENGINE WITH EXHAUST GAS RECIRCULATION

CROSS-REFERENCE TO RELATED APPLICATIONS

This application is a continuation of application Ser. No. 41,989, filed May 24, 1979, which is a continuation of Ser. No. 873,666, filed Jan. 30, 1978, which is a continuation-in-part of application Ser. No. 790,878, filed on Apr. 26, 1977, which is a continuation of application Ser. No. 649,231, filed Jan. 15, 1976, all now abandoned, and this application is also a continuation-in-part of application Ser. No. 815,449, filed on July 13, 1977, which in turn is a continuation-in-part of application Ser. No. 790,878, identified above, both now abandoned.

BACKGROUND OF THE INVENTION

This invention relates to a spark-ignition internal combustion engine which is capable of decreasing emission levels of nitrogen oxides in the exhaust gases.

It is well known that the exhaust gases from a spark-ignition internal combustion engine contain, as noxious constituents, nitrogen oxides, carbon monoxide and hydrocarbons. The emission level of nitrogen oxides (NOx) is increased as the combustion process in the combustion chamber is improved. Conversely hydrocarbons (HC) and carbon monoxide (CO) emission levels are increased as the combustion process deteriorates.

Of the emission levels of these noxious constituents, those of HC and CO can be easily decreased by improving the combustion in the combustion chamber, or by means of a catalytic converter or a thermal reactor. However, the emission level of NOx is considerably more difficult to decrease, because the emission level thereof is increased as the combustion conditions are improved, and, NOx once generated in the combustion chamber is not easily removed by a reduction reaction with a reduction catalyst, the catalyst also having problems with respect to performance and durability. Therefore, the greatest effort is now directed to the decrease of the NOx emission level. Since the NOx emission control downstream of the combustion chamber encounters the above mentioned problems, it seems better to achieve the emission control of NOx within the combustion chamber. For this purpose, it has been proposed to recirculate a portion of the exhaust gases into the combustion chamber in order to lower the maximum temperature in the combustion chamber. This measure for controlling the NOx emission is achieved by a so-called exhaust gas recirculation system (EGR system). With this EGR system, the emission level of NOx is found to decrease as the volume rate of the recirculated exhaust gas flow amount with respect to the inducted air flow amount (the amount of air flow into the engine cylinders) is increased in a range where the engine can be operated stably. This rate is referred to as "EGR rate" hereinafter. By the above-mentioned "inducted air", fresh air which does not contain EGR gas is meant. However, stable operation of the engine is not possible if the above rate is too high and accordingly the rate is restricted to a considerably low EGR rate in due consideration to both stable operation and NOx emission control.

With the increase of the above EGR rate, the level of NOx emission is decreased, but the emission levels of HC and CO conversely have a tendency to increase because smooth and stable combustion in the combustion chamber is inhibited. Accordingly, the engine requires a catalytic converter or a thermal reactor for treating HC and CO in the exhaust gases. To treat HC and CO in such a device, the temperature of the exhaust gases must be maintained sufficiently high to carry out the oxidation reaction. For this purpose, in conventional engines, the ignition timing is retarded to delay the completion time of the combustion. This measure, however, invites lowered engine output power and increased fuel consumption which are not compatible with the social theme of energy conservation.

In view of the above, the above mentioned EGR rate is not set at such a high value and therefore the decrease in NOx emission level is restricted. In addition, a catalytic converter for reducing NOx is required in the exhaust system of the engine in order to further promote the decrease of the emission level of NOx.

SUMMARY OF THE INVENTION

It is a principle object of the present invention to provide an improved spark-ignition internal combustion engine capable of a high EGR rate and a method of operating the same, whereby the emission level of NOx can be effectively lowered without degradation of the engine output power and fuel economy.

Another object of the present invention is to provide an improved spark-ignition internal combustion engine in which the EGR rate is maintained within a high range at which the stable operation of a single spark plug ignition engine is not possible. The air-fuel mixture in the combustion chamber is effectively combusted in the combustion chamber by virtue of two spark plugs disposed in each combustion chamber despite such a high EGR rate.

A further object of the present invention is to provide an improved spark-ignition internal combustion engine and a method of operating the same in which EGR rate is maintained at a high value ranging up to 50% and the charge containing such a high concentration of exhaust gases is ignited by two spark plugs disposed within each of the combustion chambers of the engine.

A further object of the present invention is to provide an improved spark-ignition internal combustion engine capable of decreasing the emission levels of CO and HC by increasing the temperature of exhaust gases without degradation of the engine output power and the fuel economy although the emission levels of these constituents seem to be necessarily increased by a relatively high EGR rate.

Other objects and features of the improved spark-ignition internal combustion engine and an improved method of operating the same engine according to the present invention will become more apparent from the following description with the accompanying drawings in which like reference numerals and characters designate corresponding parts and elements.

BRIEF DESCRIPTION OF THE DRAWINGS

FIG. 16 is a vertical section view showing another example of combustion chamber of the engine of FIG. 1;

FIG. 17 is a vertical section view showing another example of a combustion chamber of the engine of FIG. 1;

FIG. 18 is a vertical section view showing an improved intake port arrangement in the cylinder head which may be incorporated with an engine of the present invention;

FIG. 22 is a schematic transverse cross-section of the cylinder head of an engine according to the present invention.

DESCRIPTION OF THE PREFERRED EMBODIMENTS

Figure 1:
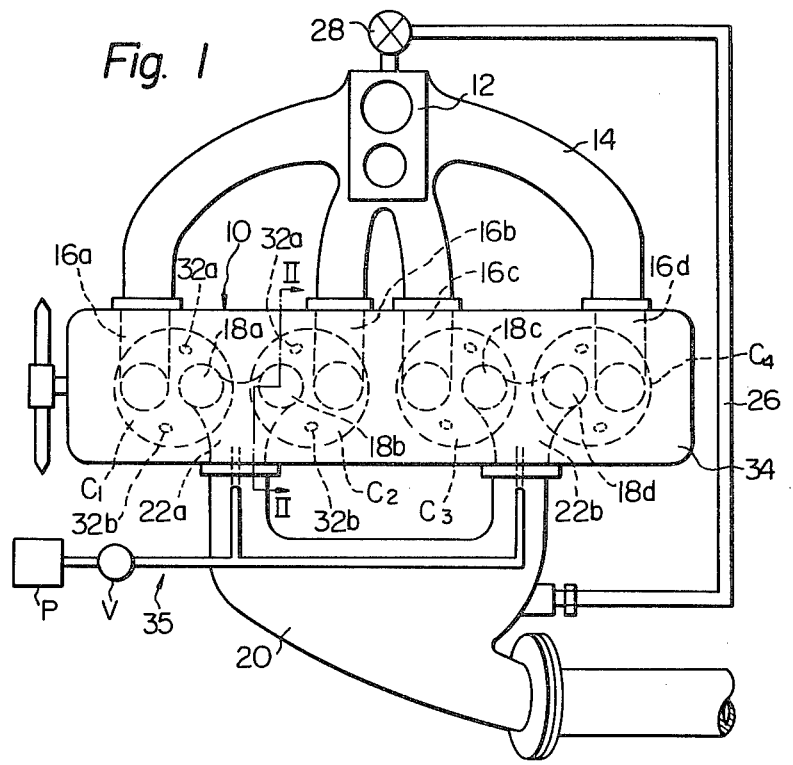
FIG. 1 is a schematic plan view of a multi-cylinder spark-ignition internal combustion engine embodying the present invention.

Referring now to FIG. 1, there is shown a preferred embodiment of a spark-ignition internal combustion engine in accordance with the principle of the present invention, in which the engine is generally designated by the reference numeral 10. The engine 10 is of a multi-cylinder type and has, in this instance, four cylinders $C_1$ to $C_4$ as shown in FIG. 1, each of the cylinders conventionally being formed at its top portion with a combustion chamber though not shown in FIG. 1. The engine 10 is equipped with a carburetor 12 or air-fuel mixture supply means which communicates through an intake manifold 14 with the intake ports $16a$ to $16d$ of the cylinders $C_1$ to $C_4$. The carburetor 12 is constructed and set to produce and supply into the combustion chambers an air-fuel mixture having an air-fuel (gasoline) ratio within the stoichiometric region, i.e., ranging from 13:1 to 16:1. The air-fuel ratio mentioned in this application means the weight ratio of fresh air which does not contain EGR gas and fuel inducted into the combustion chamber. The exhaust ports $18a$ to $18d$ of the cylinders $C_1$ to $C_4$ communicate with an exhaust manifold 20 through siamesed ports $22a$ and $22b$ which are preferably formed through the cylinder head 34 of the engine 10. The exhaust manifold 20 functions as a thermal reactor in this instance. It will be understood that the exhaust manifold 20 may not function as the thermal reactor and may serve as a mere exhaust manifold. In this case, the mere exhaust manifold may be followed by a catalytic converter.

Connected to the exhaust manifold 20 is a conduit 26 forming part of an exhaust gas recirculating system or means (no numeral), the conduit 26 functioning to recirculate into the cylinders a portion of exhaust gases discharged from the cylinder by introducing the portion of exhaust gases into inducted air or intake air entering the cylinders, and being accordingly connected through a valve 28 for controlling exhaust gas recirculation (EGR) to the induction passage of the carburetor 12. The control valve 28 is arranged to control the amount of exhaust gases recirculated, for example, in accordance with the venturi vacuum which is a function of the amount of the inducted air or the intake air. The control valve 28 is constructed to be operable to control the EGR rate of a range of from about 10 to 50%. The controlled EGR rate is preferably in the range of 15-17% for an intermediate average rate and 25-40% for a maximum rate.

Figure 2:
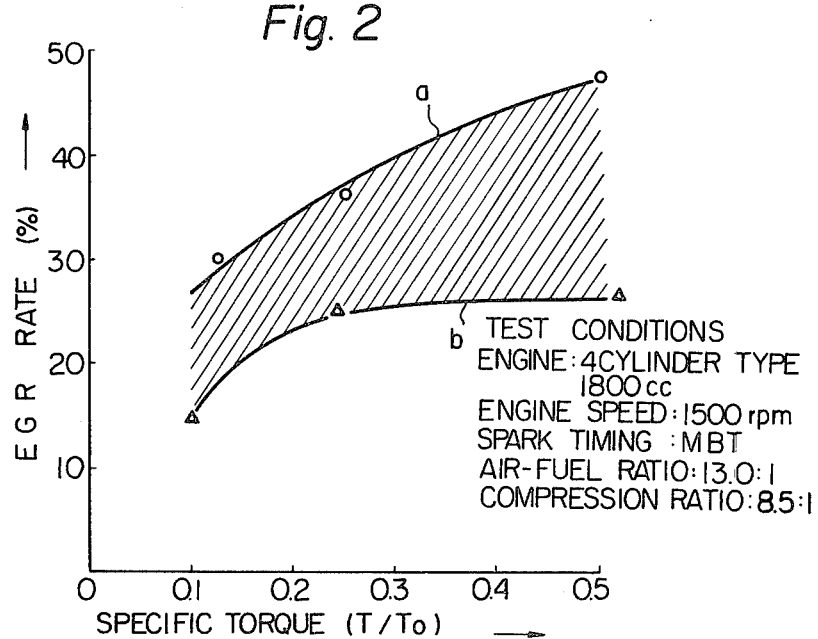
FIG. 2 is a graph showing "stable operation EGR limit" of the engine according to the present invention and of a conventional single spark plug ignition engine in terms of "EGR rate" and "specific torque"
Figure 3:
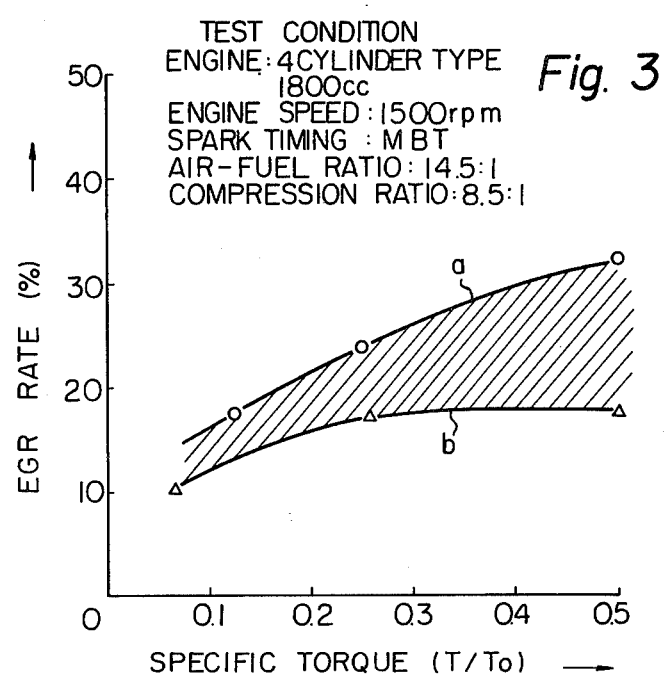
FIG. 3 is a graph similar to FIG. 2, but different in air-fuel ratio.

Furthermore, the control valve 28 is scheduled to be possible to control the EGR rates within a range indicated by oblique lines in FIGS. 2 and 3 during engine operating conditions in which NOx emission level lowering is particularly required. In FIGS. 2 and 3, a curve a represents an "EGR limit for stable operation" of the engine according to the present invention and a curve b represents an "EGR limit for stable operation" of a single spark plug ignition engine which is identically the same as that according to the present invention except that only one spark plug is disposed in each combustion chamber thereof. In the case where the engine according to the present invention is operated while disabling of one of two spark plugs disposed in each combustion chamber, its "EGR limit for stable operation" is generally the same as that indicated by the curve b. The graph of FIG. 2 was obtained by the tests conducted under test conditions in which the engine was of the cylinder type with a displacement of 1800 cc, enging speed was 1,500 rpm, spark timing was M.B.T. (minimum advance required for best torque), air-fuel ratio of the mixture supplied to the combustion chamber was 13:1, and compression ratio was 8.5:1. The graph of FIG. 3 was obtained by the tests conducted under the same test conditions except that the air-fuel ratio of the mixture supplied to the combustion chamber was 14.5:1.

Meant by the above-mentioned "stable operation EGR limit" is the maximum value of EGR rate at a specific brake torque at which maximum value the combustion carried out in the combustion chamber and the engine operation become unstable and accordingly usual engine operations cannot be maintained.

Therefore, the "stable operation EGR limit" means the maximum value of EGR rate at a specific brake torque (a measured brake torque T/the maximum brake torque of the engine $T_o$, at the same engine speed) at which maximum value a cycle-to-cycle fluctuation of indicated mean effective pressure (I.M.E.P.) represented by $\sigma P_i/\overline{P}_i$ reaches a value of 0.1, in which $\sigma P_i$ is "standard deviation of I.M.E.P." and $\overline{P}_i$ is "mean I.M.E.P." The standard deviation of I.M.E.P. ($\sigma P_i$) is, as usual, calculated by the following formula:

$$\sigma P_i = \sqrt{\sum_{m=1}^{n} (\overline{\rho}_i - \rho_{im})^2 \frac{1}{n}}$$

where
 $P_{im}$ = a measured value of I.M.E.P.
 n = 400 (400 measured values in 400 cycles of the engine, used for determining $\sigma P_i$)

The mean I.M.E.P. ($\overline{P}_i$) is, as usual, calculated by the following formula:

$$\overline{P}_i = \frac{1}{n} \sum_{m=1}^{n} P_{im}$$

Accordingly, when the EGR rate exceeds the "stable operation EGR limit", the value of $\sigma P_i/\overline{P}_i$ exceeds 0.1 and consequently the stable engine operation becomes impossible. It is to be noted that the stable operation EGR limit represented by the line b is similar to that of conventional engines which have only one spark plug in each combustion thereof and are equipped with exhaust gas recirculating system. In other words, the stable operation EGR limits represented by the curve b correspond to those of the conventional engines. Therefore, the EGR rates represented by the curve b are hereinafter referred to as "Maximum EGR rates".

The reference numeral 35 represents a device or means for supplying so-called secondary air into the exhaust system of the engine or into the stream of the exhaust gases discharged from the combustion chamber. In this case, the device 35 is composed of a secondary air supply pipe (no numeral) opened to the siamesed exhaust ports 22a and 22b. The secondary air supply pipe is connected to an air pump P through a control valve V for controlling the amount of the secondary air supplied to the exhaust ports. The control valve V may be a check valve when the secondary air is inducted into the exhaust ports by the action of pulsation of exhaust gas pressure in the exhaust system, in which the air pump P is removed.

While only the carburetor 12 is shown and described as a part of the air-fuel mixture supply means with reference to FIG. 1, it will be seen that the carburetor 12 may be replaced with a fuel injection system for injecting metered fuel into the combustion chamber or into an air induction passage communicable with the combustion chamber though not shown.

Figure 4:
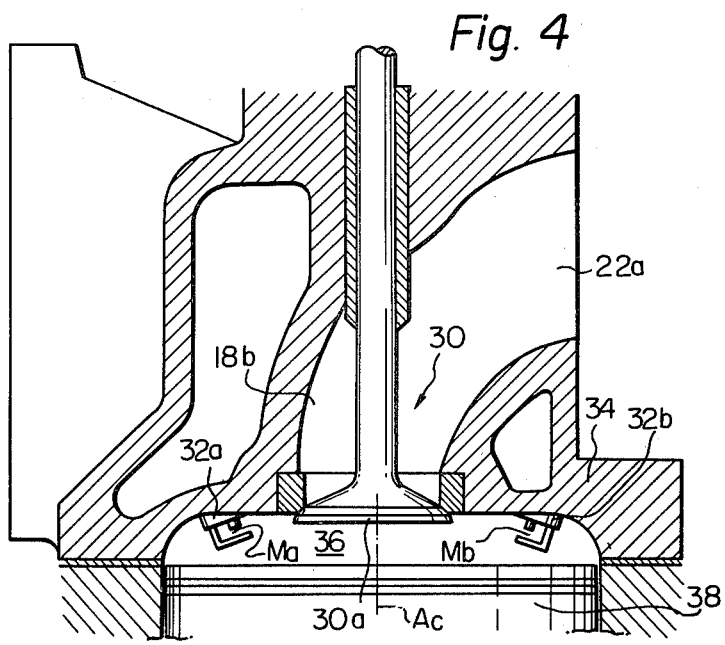
FIG. 4 is a vertical section view taken along the line II—II of FIG. 1.

FIG. 4 illustrates the engine construction around the cylinder $C_2$. As seen the combustion chamber indicated by the reference numeral 36 is defined between the cylinder head 34 secured to a cylinder block (no numeral) and the crown of a piston 38 which is reciprocally movably disposed in the bore of the cylinder. An exhaust valve 30 has its valve head 30a which is operatively disposed in the exhaust port 18b forming part of the siamesed port 22a. Two spark plugs 32a and 32b are disposed through the cylinder head 34 and extend into the combustion chamber 36, and are spaced oppositely from the center axis $A_c$ as shown in FIG. 4.

With the arrangement mentioned above, the inventors intend to effectively and reliably burn, in the combustion chamber, the air-fuel mixture containing considerable amounts of incombustible recirculated exhaust gases via a plurality of sparks generated by a plurality of spark plugs, in which the ignition by the spark plugs may be carried out simultaneously or one after another in the ignition timing. When ignited by two spark plugs mentioned above, the distance of flame propagation is shortened compared with conventional engines using only one spark plug in each combustion chamber. Thus combustion, according to the present invention, is carried out fast and completely, thereby accomplishing stable and smooth combustion. This results in stable operation of the engine even when considerable amounts of exhaust gases are present in the combustion chamber. The inventors have found in fact that the engine according to the present invention can be stably operated even when a considerably high EGR rate, ranging from 10 to 50%, is used. Therefore, the emission level of NOx and hydrocarbons (HC) is effectively lowered. Conventional engines having only one spark plug per combustion chamber cannot be stably operated with a considerably high EGR rate.

Additionally, experiments have revealed that the engine according to the present invention can be stably operated even when the exhaust gases are recirculated at a level above "Maximum EGR rates" at which conventional engines having only one spark plug in each combustion chamber thereof cannot be stably operated.

Figure 5:
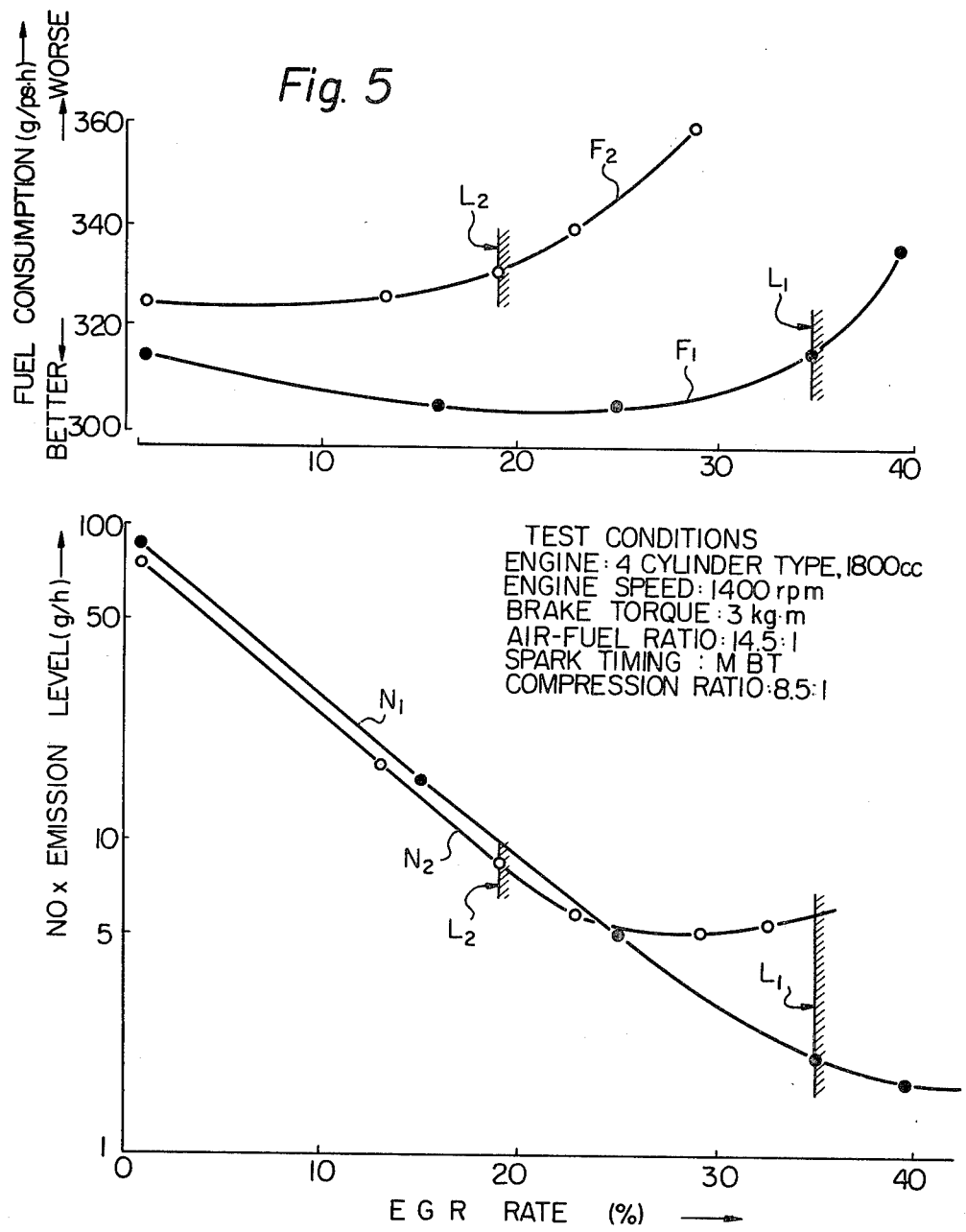
FIG. 5 is a graph showing the comparison between the engine according to the present invention and the conventional single spark plug ignition engine in NOx emission level and fuel consumption with varied EGR rate.
Figure 6:
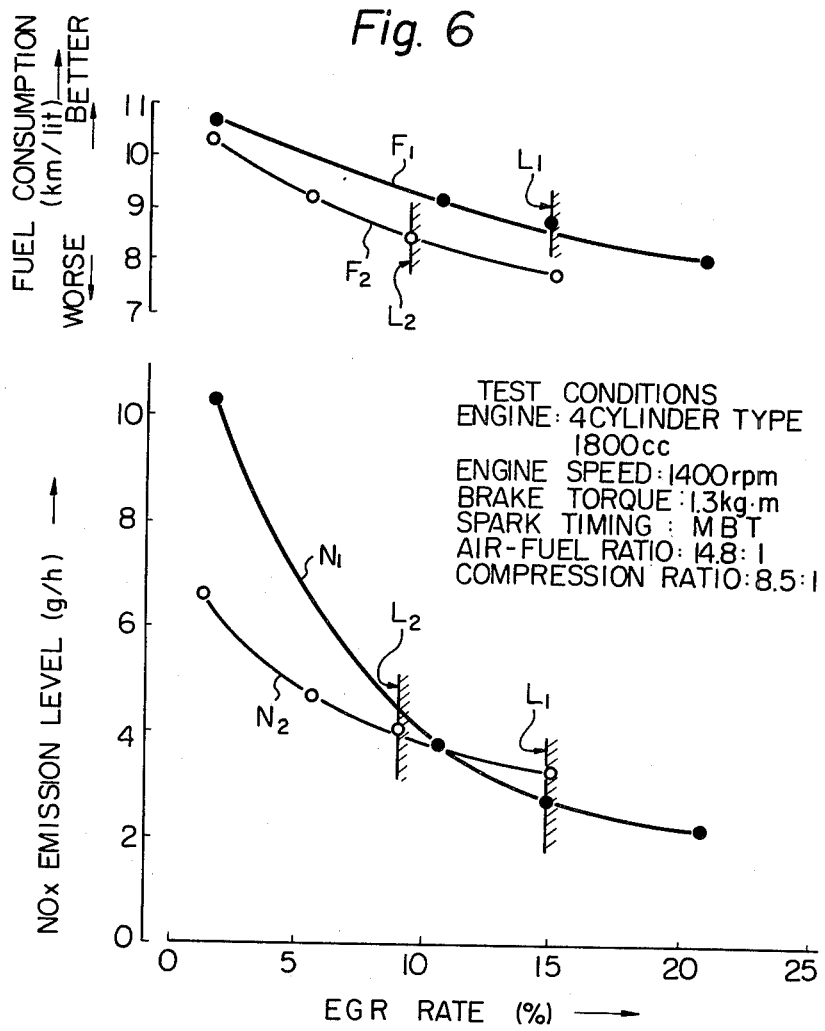
FIGS. 6, 7, 8 and 9 are graphs similar to FIG. 5, but under different test conditions.
Figure 7:
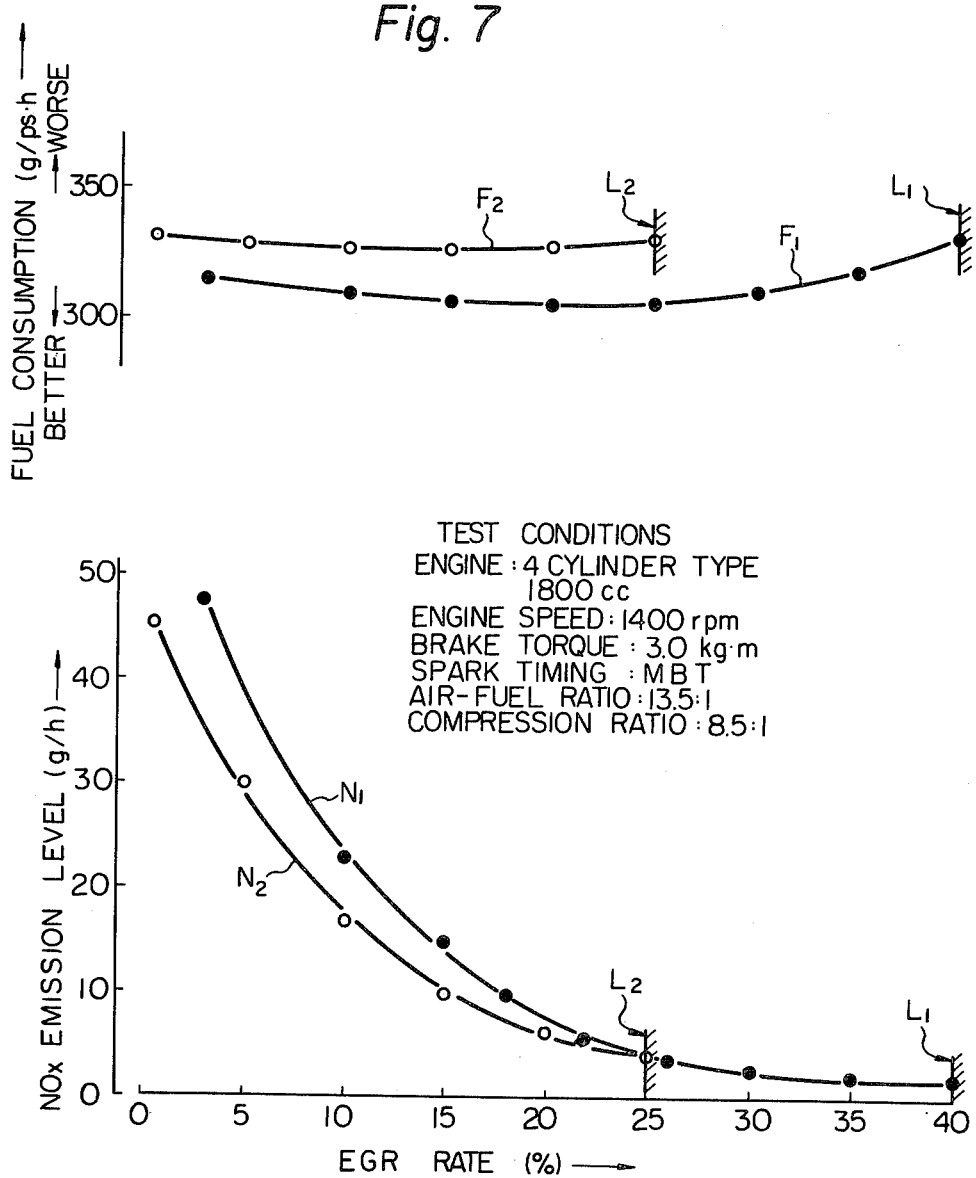
Figure 8:
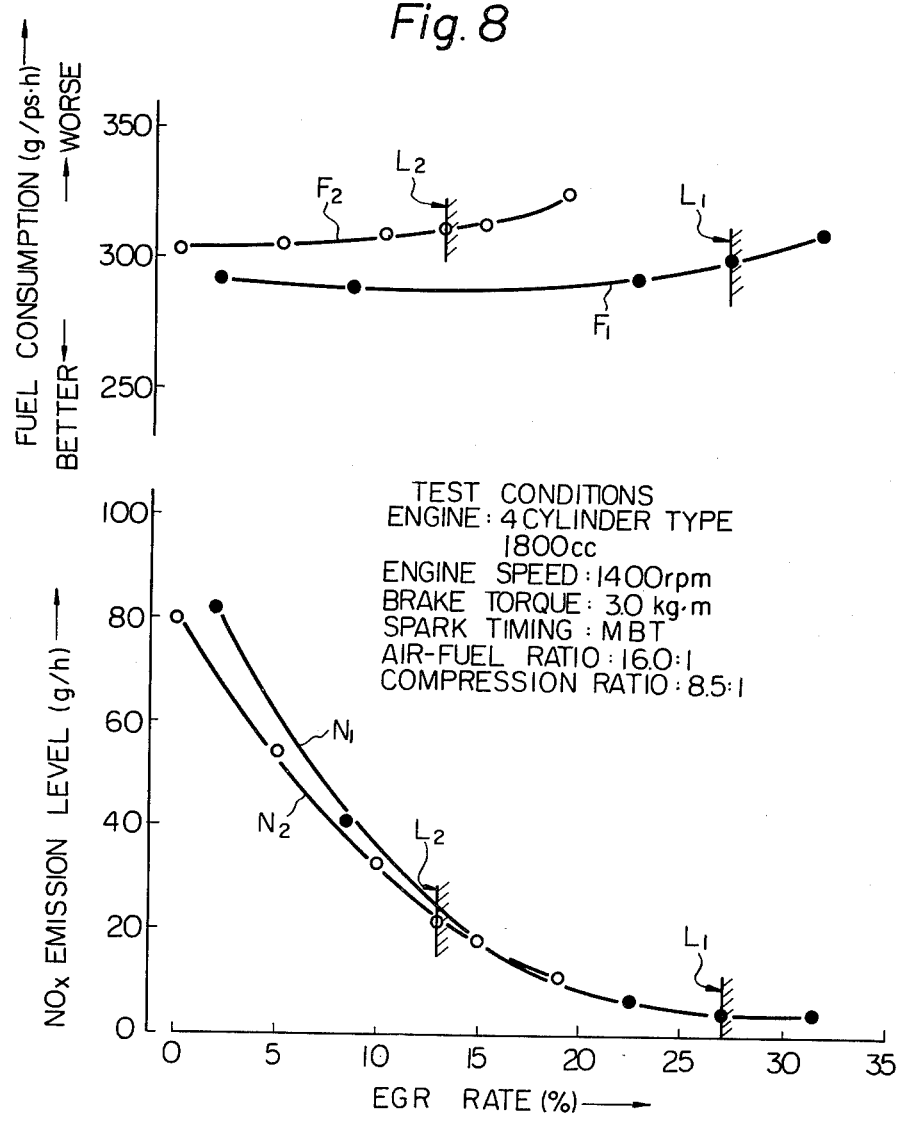
Figure 9:
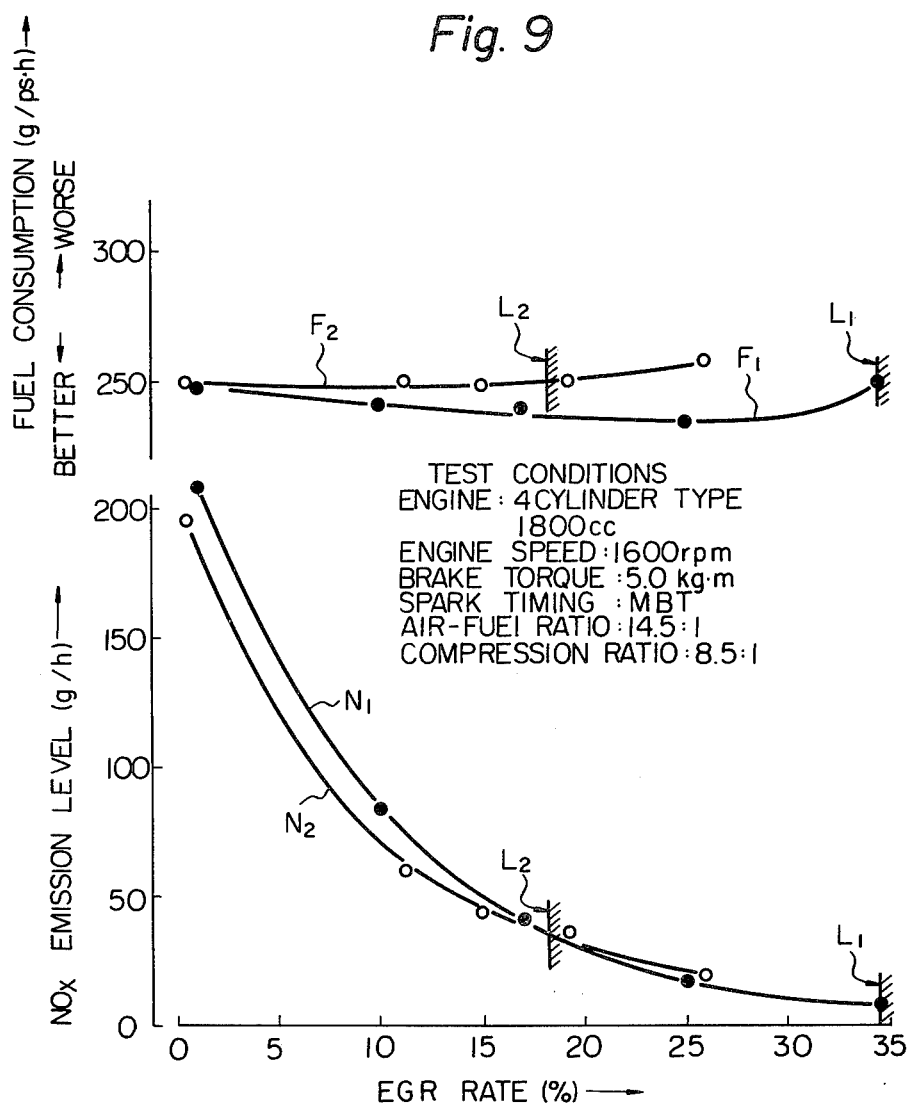

FIG. 5 shows significant effects obtained by the present invention in comparison with prior art. In this figure, a curve $N_1$ represents NOx emission levels (g/h) of the engine according to the present invention and a curve $N_2$ represents NOx emission levels of the single spark plug engine which is identically the same as that according to the present invention except that only one spark plug is disposed in each combustion chamber. Lines $L_1$ and $L_2$ represent the EGR limit for stable operation of the engine according to the present invention and that of the single spark plug engine, respectively.

As is apparent from FIG. 5, in the range of EGR rate lower than the EGR limit $L_2$ for stable operation of the single spark plug engine, the NOx emission levels of the engine according to the present invention is higher than that of the single spark plug engine. However, in the range of EGR rate higher than the EGR limit $L_2$, the NOx emission level of the engine according to the present invention becomes lower than that of the single spark plug engine. It was never conceived nor considered in the prior art to operate a spark ignition internal combustion engine with a plurality of ignition points under high EGR rates above the "maximum EGR rates" while regulating the air-fuel ratio within the stoichiometric region. It can be said that only such operation of the multiple plug ignition engine as mentioned above makes it possible to reduce the NOx emission level in the exhaust gases to a severe target level such as 5 g/h.

Additionally in FIG. 5, curves $F_1$ and $F_2$ represent fuel consumptions (g/ps.h) of the engine according to the present invention and the above-mentioned single spark plug ignition engine, respectively, in terms of the increaesed EGR rate. It will be apparent from FIG. 5 that the fuel consumption of the engine according to the present invention is much better than that of the conventional single spark plug ignition engine. It will also be apparent that the fuel consumption of the single spark plug ignition engine degrades as the EGR rate increases, whereas that of the engine according to the present invention is gradually improved until the EGR rate reaches a high level. The graphs in FIG. 5 were obtained by the tests conducted under conditions where the engine was of the four-cylinder type with a displacement of 1800 cc, spark timing was M.B.T. (minimum advance required for best torque), air-fuel ratio of the mixture supplied to the engine was 14.5:1, engine speed was 1400 r.p.m., brake torque was 3 Kg-m, and compression ratio was 8.5:1.

FIGS. 6 to 9 inclusive show the significant effects according to the present invention which are similar to that a FIG. 5 except for the test conditions and accordingly the corresponding lines are indicated by the same reference characters as in FIG. 5. It will be appreciated that the significant effects according to the present invention, similar to in FIG. 5 are attained under various test conditions shown in FIGS. 6 to 9 inclusive.

As will be appreciated, the EGR control valve 28 is arranged and driven to achieve exhaust gas recirculation in a range above the "Maximum EGR rates" during an engine operating range such as an engine acceleration in which NOx emission level greatly increases.

Experiments have also revealed that low octane fuel can be used when the EGR rate is high. Further low octane fuel can be used in the engine of the invention without being subjected to knocking. Thus the compression ratio of the engine can consequently be increased thereby contributing to the increase of engine output power. The knock suppressing tendency allows the upper limit of the engine coolant temperature to be raised. Therefore the inner wall of the combustion chamber is not excessively cooled and is maintained at a relatively high temperature, resulting in decrease of the emission levels of HC which are liable to be generated at the inner wall of the combustion chamber.

Figure 10:
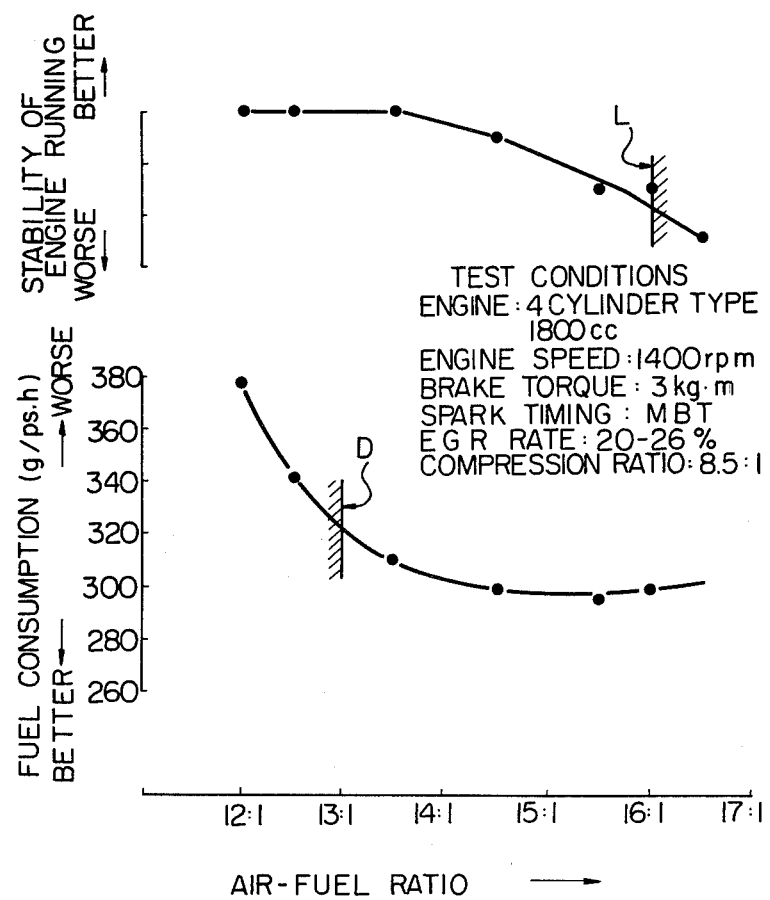
FIG. 10 is a graph showing fuel consumption and engine stability varied air-fuel-ratio.

FIG. 10 shows the reason why the above-mentioned air-fuel ratio of the mixture in the combustion chamber is within the range from 13:1 to 16:1. As viewed, the fuel consumption is degraded to a level not adequate for practical use as indicated by a line D when the air-fuel ratio is lowered below its lower limit of 13:1, whereas stability (sensed by physical functions) of engine operation is lost and the above-mentioned cycle-to-cycle fluctuation of I.M.E.P. exceeds a value of 0.1 as indicated by a line L when the air-fuel ratio exceeds its higher limit of 16:1. The experimental data in FIG. 10 was obtained by the test conducted with a four-cylinder type engine with a displacement of 1800 cc under conditions in which engine speed was 1400 r.p.m., brake torque was 3 Kg-m, spark timing was M.B.T., and the EGR rate was controlled at a level from 20 to 26% to maintain NOx emission level of 5 g/h, and compression ratio was 8.5:1.

Figure 11:
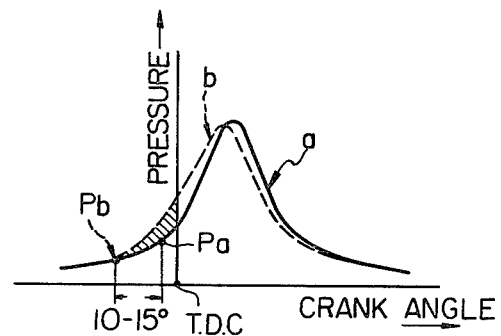
FIG. 11 is a graph showing pressure variation in a combustion chamber with respect to degrees of crankshaft rotation.

Referring now to FIG. 11, the ignition timing of the engine according to the present invention is set at the minimum advance for best torque (M.B.T.). In this case, the ignition timing is set very near the top dead center (T.D.C.), i.e. at a point Pa 10° to 15° closer T.D.C. than the point Pb of the conventional single spark plug ignition engine as clearly shown. This is possible because the burning time in the combustion chamber is shortened and the pressure in the combustion chamber more rapidly maximized. This ignition advance makes possible a reduction in the energy loss indicated by the oblique lined portion shown in FIG. 11. Curves a and b indicate the pressure variations in the combustion chambers of the present invention and the conventional engine, respectively, in terms of crankshaft rotation. In other words, the engine of the present invention is more economical because less work is done on the piston before it reaches top dead center.

Figure 12:
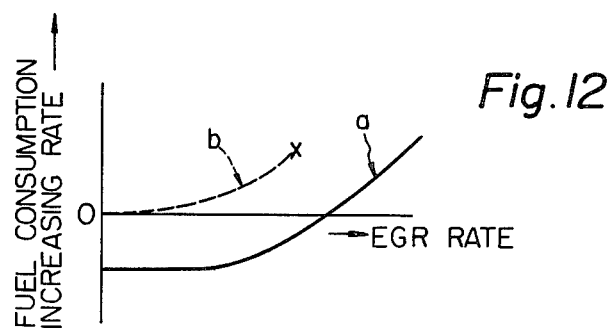
FIG. 12 is a graph showing fuel consumption increasing rate in tems of EGR rate.

As the result of the economization of fuel energy mentioned above, the fuel consumption of the engine according to the present invention is noticeably better than that of the conventional engine as shown in FIG. 12, in which curves a and b indicate the fuel consumption increasing rate of the engine of the present invention and the conventional engine, respectively, in terms of EGR rate.

Figure 13:
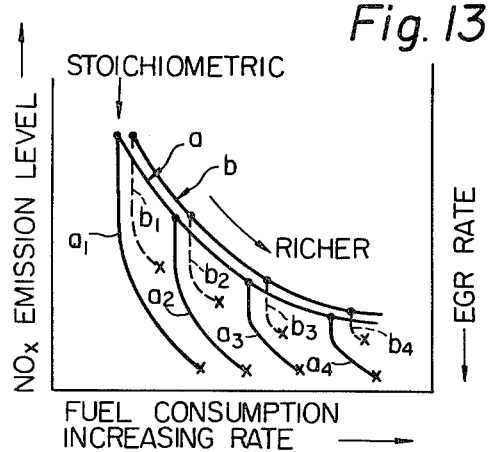
FIG. 13 is a graph showing emission level of NOx in terms of fuel consumption increasing rate and the EGR rate.

FIG. 13 shows the fuel consumption increasing rate in terms of the NOx emission level and the EGR rate in which curves a and b indicate the cases of the engine of the present invention and conventional engine, respectively. It is known that the emission level of NOx is maximized by supplying an air-fuel mixture of an air-fuel ratio within stoichiometric region, whereas it is decreased as the air-fuel mixture is made leaner or richer. However, the engine of the present invention is supplied with an air-fuel mixture near stoichiometric, for instance, that having air-fuel ratios ranging from 13:1 to 16:1. The curve $a_1$ branched from the curve a indicates an engine operation on a stoichiometric air-fuel ratio mixture and the curves $a_2$, $a_3$ and $a_4$ indicate an engine operation on mixtures which are made gradually richer. As apparent from the figure, as the EGR rate for the engine according to the present invention is increased, the emission level of NOx is decreased, but the fuel consumption increasing rate is increased. The conventional engine however becomes unstable under an EGR rate larger than a certain level. With further increased EGR rates, the conventional engine becomes impossible to operate due to occurrence of misfiring, which is represented by the symbol x of curves $b_1$–$b_4$ in FIG. 13. This misfire limits the NOx emission control by the EGR to a given level as indicated by the symbol x and therefore the conventional engine requires richer air-fuel mixtures as indicated by the curves $b_2$, $b_3$ and $b_4$ in order to decrease the emission level of NOx. Consequently, deterioration of fuel economy is unavoidable in the conventional engine.

Figure 14A:
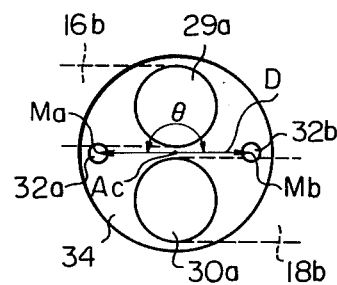
FIGS. 14A and 14B are a plan view showing an example of a the combustion chamber of the engine of FIG. 1 and a vertical section view of the combustion chamber of FIG. 14A, respectively.
Figure 15A:
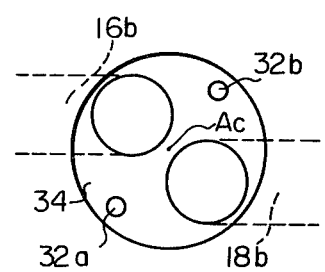
FIGS. 15A and 15B are a plan view showing another example of a combustion chamber and a vertical section view of the combustion chamber of FIG. 15A, respectively.
Figure 14B:
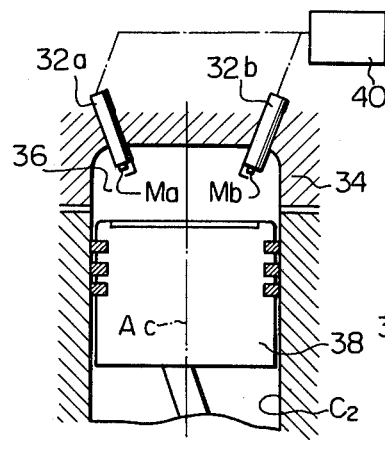
Figure 15B:
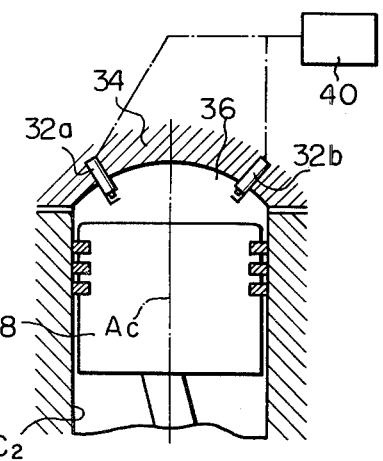

FIGS. 14A and 14B illustrate in detail the location of spark plugs in each combustion chamber 36, in which two spark plugs 32a and 32b are disposed within the combustion chamber 36 of a pancake type or a flat cylindrical shape, and operatively disposed at portions of the cylinder head 34 are the valve heads 29a and 30a of the intake and exhaust valves, respectively. The intake and exhaust ports 16b and 18b are communicable with the combustion chamber 36 through the intake and exhaust valves, respectively, and arranged to be opened and closed by the intake valve head 29a and the exhaust valve head 30a, respectively. As shown, the two spark plugs 32a and 32b are so located that the midpoints $M_a$ and $M_b$ of spark gaps thereof lie spaced apart from the center axis $A_c$ of the combustion chamber 36 or the cylinder bore and spaced apart from each other. Additionally, the midpoints $M_a$ and $M_b$ are opposite to each other about the center axis $A_c$ of the combustion chamber and lie substantially equidistant from the center axis $A_c$. It is preferable to most stably operate the engine that the two spark plugs are located such that a distance D between the midpoints $M_a$ and $M_b$ is within a range from 0.3 to 1.0 times the diameter of the cylinder bore, and the midpoints $M_a$ and $M_b$ define an angle ranging from 140° to 180° about the center axis $A_c$ of the cylinder. The spark plugs 32a and 32b are more preferably disposed such that the midpoints $M_a$ and $M_b$ are substantially symmetrical about the center axis $A_c$, and the distance D is 0.5 times the diameter of the cylinder bore. The chamber 36 defined by the inner surface of the cylinder head 34 is simple and formed fundamentally into the shape of a body of rotation having its axis aligned with the center axis of the cylinder bore, allowing some deformations of the cylinder head inner surface for disposing valves and spark plugs. Such shapes of combustion chamber are exemplified in FIGS. 14A to 17, in which FIGS. 14A and 14B show the pancake type, FIGS. 15A and 15B show a hemispherical type, and FIGS. 16 and 17 show heron types where cavity-type pistons 38' and 38" are employed, respectively. As shown and described hereinbefore, in the engine according to the present invention, the crown of the piston is generally formed into a "non-convex shape" which means that the piston crown is not convex toward the combustion chamber or does not protrude into the combustion chamber. However, some unevenness or small projections formed on the piston crown may be allowable to compensate the compression ratio of the engine. The simplification of the shape of the combustion chamber defined by the piston crown and the inner surface of the cylinder head contributes to decreasing the ratio of the surface area S of the combustion chamber to the volume V of same (i.e. a ratio S/V). The quench area and consequently the HC emission level are thus decreased. In addition, the simple construction of the combustion chamber is readily formed by machining as compared with combustion chambers having complicated constructions. Consequently it is easier to make uniform the effective volumes of a plurality of combustion chambers of a multi-cylinder internal combustion engine. A further decrease in the HC emission level is promoted by a smooth surface of the combustion chamber achieved by grinding, the grinding treatment being made possible by employing a simple construction.

As indicated in FIGS. 14B and 15B, the two spark plugs 32a, and 32b are operatively connected to a known device 40 or means for setting the spark timings of the two spark plugs 32a and 32b at M.B.T. in order to operate the engine at the spark timing of M.B.T.

For further improving the effect of the present invention, each of the spark plugs 32a and 32b is preferably arranged to generate a high spark energy ranging from 25 to 100 mj (milli-joule) at a spark gap of about 1.1 mm in order to reliably ignite the air-fuel mixture present in the combustion chamber.

FIG. 18 illustrates a lower intake port arrangement which may be incorporated with an engine of the present invention. FIG. 18 shows the intake port arrangement as taken in a cross-section parallel to the cylinder bore center axis $A_c$ and containing the center axis $A_i$ of the intake port 16a and the center $C_p$ of the crown surface of the piston at the top dead center, and viewed from a direction of the center axis (will be mentioned hereinafter) of a crankshaft of the engine. As viewed, the intake port 16a has a straight portion in its center axis $A_i$ and is so formed that the extension E of the straight portion of the center axis $A_i$ passes through an opening defined by the inner peripheral surface of the intake valve seat 42 to enter the combustion chamber 36 and traverses a plane $P_p$ perpendicular to the cylinder center axis $A_c$ through an angle $\alpha_1$ smaller than that $\alpha_2$ through which a line $L_c$ traverses the same plane $P_p$.

The line $L_c$ contains the center $C_p$ of the crown surface of the piston 38 at its top dead center and the center $C_a$ of an inner aperture $A_p$ which is defined by the inner edge of the annular surface of the valve seat 42 which annular surface is exposed to the combustion chamber 36.

In other words, the lower intake port 16a is formed as follows: the intake port has a portion whose center axis lies on a flat plane (identified as E) parallel to the center axis (identified as $S_c$ in FIG. 19) of the crankshaft. A part of the flat plane lies within the opening defined by the inner peripheral surface of the valve seat 42 and is inclined from the plane $P_p$ through the angle $\alpha_1$ smaller than that of a flat plane which contains the line $L_c$ connecting the center $C_a$ of the inner aperture $A_p$ and the center $C_p$ of the crown surface of the piston 38 at the top dead center and parallel to the crankshaft center axis $S_c$. The reference numerals 44 represents a valve guide through which the valve stem (not shown) of the intake valve is slidably disposed. Represented by the reference character $C_b$ is the center of the outer aperture $A_q$ of the valve seat 42 which outer aperture is defined by the inner edge of an annular surface of the valve seat embedded in the cylinder head 34.

It will be understood that the above-mentioned center axis $A_i$ of the intake port corresponds to a line connecting the centers of gravity of cross-sections of the intake port.

Figure 19:
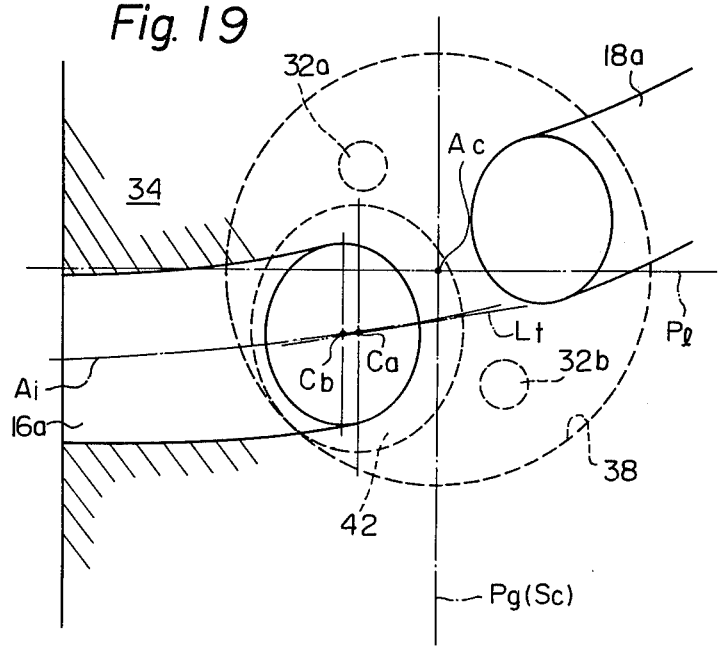
FIG. 19 is a schematic plan view of the intake port arrangement of FIG. 18.

FIG. 19 illustrates an offset intake port arrangement which may be adopted for the engine of the present invention. This arrangement is shown in a cross-section parallel to the center axis $S_c$ of the crankshaft and containing the curved center axis $A_i$ of the intake port 16a, and viewed from a direction of the cylinder bore center axis $A_c$. As shown in FIG. 19, a tangent line $L_t$ of the curved center axis $A_i$ of the intake port 16 at the center $C_b$ of the outer aperture $A_g$ of the valve seat 42 is spaced apart from the cylinder bore center axis $A_c$, crossing longitudinal plane $P_g$ containing the cylinder bore center axis $A_c$ and the crankshaft center axis $S_c$ at the same side of the combustion chamber as the center $C_b$ of the outer aperture of the valve seat with respect to a lateral plane $P_l$ or perpendicular to the longitudinal plane $P_g$ and containing the cylinder bore center axis $A_c$.

In other words, the intake port 16a is formed as follows: a flat tangent plane (identified as $L_t$) of a plane containing the center axis $A_i$ and parallel to the cylinder bore center axis $A_c$, at the center $C_b$ is spaced apart from the cylinder bore center axis $A_c$. It will be understood that the above-mentioned flat tangent plane is parallel to the cylinder bore center axis $A_c$. The flat tangent plane crosses the longitudinal plane $P_g$ at the same side of the combustion chamber as the center $C_b$ with respect to the lateral plane $P_l$.

While only the lower and offset intake port 16a has been shown and described to be arranged as shown in FIGS. 18 and 19, it will be understood that some other intake ports may be employed.

With each intake port thus arranged when the piston 38 descends toward the bottom dead center, the air-fuel mixture is induced through the intake port into the combustion chamber 36 generally tangentially with respect to the inner wall of the engine cylinder. Additionally, since the extension of the straight portion of the intake port center axis $A_i$ passes through the opening of the valve seat 42, the intake mixture can be inducted into the combustion chamber 36 generally parallel with respect to the piston crown surface, without decreasing the momentum of the intake air-fuel mixture stream. As a result, a strong swirl of the air-fuel mixture is produced in the combustion chamber 36.

Figure 20:
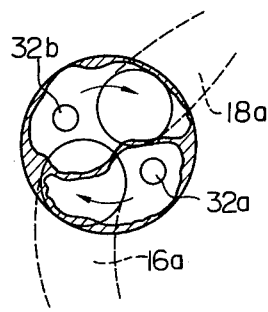
FIG. 20 is a schematic illustration showing a manner of combustion in the combustion chamber of the engine of the present invention.
Figure 21:
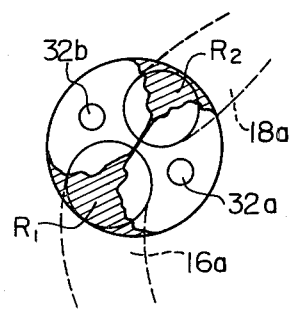
FIG. 21 is a schematic illustration similar to FIG. 14 but showing another combustion manner.

By virtue of the strong swirl, the shortening effect of the combustion time of the air-fuel mixture is further improved since the flame fronts originated at the two spark plugs 32a and 32b can easily propagate to all over the combustion chamber 36. This results from the fact that the two flame fronts originated at the two spark plugs 32a and 32b propagate not only in the radial directions but also in the direction indicated by arrows shown in FIG. 20 which direction corresponds to the rotating direction of the swirl. In this connection, if the string swirl is not produced in the combustion chamber 36 as shown in FIG. 21, the flame fronts propagate only in the radial direction and accordingly the air-fuel mixture present in portions $R_1$ and $R_2$ of the combustion chamber 36 remains unburned even when the flame fronts meet with each other at the central portion of the combustion chamber 36. It will be appreciated from FIG. 20, that, by employing the intake port arrangement shown in FIGS. 18 and 19, the flame fronts originated at the two spark plugs can propagate to the combustion chamber portions $R_1$ and $R_2$ indicated in FIG. 21 when the flame fronts meet with each other at the central portion of the combustion chamber 36.

Experiments revealed that the shortening effect of the combustion time of the charge in the combustion chamber can be further improved by employing the above-mentioned intake port arranged as indicated in FIGS. 18 and 19, compared with some other intake port which employs only such offset arrangement as indicated with FIG. 19. In this connection, the engine equipped with the intake port having both arrangements shown in FIGS. 18 and 19 provides the following advantages as compared with the engine equipped with the offset intake port having the arrangement shown in FIG. 19 and without the lower intake port arrangement shown in FIG. 18:

(1) The EGR limit for stable operation of the engine is extended to a noticeably higher level of EGR rate.

(2) The NOx emission level is greatly lowered at a relatively high EGR rate range.

(3) The fuel consumption (g/ps.h) is better, particularly at a relatively high EGR rate range.

(4) The HC omission level is greatly lowered. The above-described advantages are further improved by decreasing the cross-section of the intake port to a degree which does not cause engine output power lowering.

While the intake port has been shown and described as curved for the purpose of producing the swirl in the combustion chamber in FIG. 19, it will be noted that the intake port may be straight in a cross-section parallel to the center axis $S_c$ of the crankshaft and containing the center axis $A_i$ of the intake port, and as viewed from a direction of the cylinder bore center axis $A_c$, as will be illustrated in FIG. 22.

FIG. 22 is a plan view schematically illustrating an intake-exhaust arrangement of the cylinder head 34 in which the intake port is arranged straight. In this case, the above-mentioned tangent line $L_t$ (shown in FIG. 19) aligns with the center axis $A_i$ of the intake port. As viewed, the center axis $A_i$ of the intake port 16a is spaced apart from a lateral vertical plane $P_l$ containing cylinder center axis $A_c$ and perpendicular to a longitudinal vertical plane $P_g$ which contains the cylinder center axis $A_c$ and the center axis $S_c$ of the crankshaft. Additionally, the center $C_i$ of the inner end surface of the intake valve head 29a is located spaced apart from the lateral vertical plane $P_l$ and opposite to the center $C_e$ of the inner end surface of the exhaust valve head 30a about the lateral vertical plane $P_l$. The two exhaust ports of neighboring two cylinders, for examples $C_1$ and $C_2$, are joined and siamesed in the cylinder head 34 to form siamesed exhaust port 22a. Due to this siamesed port, the exhaust temperature is kept relatively high. Accordingly, the unburned HC and CO in the exhaust gases can be burned in the exhaust system of the engine 10 and are further effectively burned by an after-burner such as a catalytic converter or a thermal reactor which may be connected to the exhaust system. In this connection, the conventional engine is arranged to retard the ignition timing so as to keep the exhaust temperature high. On the contrary, by the reasons set forth above, the engine of the present invention does not require this retardation of ignition timing for decreasing the emission levels of unburned HC and CO and therefore the ignition timing of the engine according to the present invention is set at the optimum condition at which the engine output power and the fuel economy are not decreased. It is to be noted that, by adopting the siamesed exhaust port arrangement, the exhaust gas temperature is considerably raised and accordingly it becomes possible to close the spark timing at M.B.T. Furthermore, the adoption of the siamesed port arrangement greatly contributes to the solution of the problem of engine operation with a high EGR rate which can decrease the NOx emission level but increase the emission levels of HC and CO. While the crankshaft center axis $S_c$ has been shown and described to lie on the longitudinal plane $P_g$ with reference to FIGS. 19 and 22, it will be understood that the crankshaft center axis $S_c$ may lie spaced apart from the longitudinal plane $P_g$ in some cases.

In the instance of FIGS. 1 and 22, the temperature maintaining effect of the exhaust gases due to the siamesed ports is promoted by making the cylinder head of a cast iron which has a relatively low thermal conductivity. When the cylinder head is made of an aluminium alloy, it is advantageous to insert port liners 23 into the exhaust ports for prevention of exhaust gas temperature drop as shown in FIG. 22. It is to be understood that using the port liners is effective for maintaining exhaust gas temperature even when the siamesed ports configuration is not adopted. The exhaust system of the engine may further be equipped with a turbosupercharger having a turbine rotated by high temperature exhaust gases from the siamesed ports in order to effectively recover the energy of the high temperature exhaust gases.

As viewed in FIGS. 1 and 22, the engine 10 of the present invention preferably has a cross flow induction-exhaust cylinder head in which the intake port 16a to 16d is formed on one side of the cylinder head 34 of the engine 10 to be connected to the runner of intake manifold 14, whereas the exhaust port 18a to 18d is formed on the opposite side of the same to be connected to the runner of the exhaust manifold 20. Such intake and exhaust ports configuration contributes to an increase of the scavenging efficiency and the volumetric efficiency of the engine which promote the secure combustion is the combustion chamber improving the engine output power. By virtue of the cross-flow induction-exhaust cylinder head construction, the exhaust port is not cooled by the inducted air passing through the intake port and accordingly the thermal oxidation reaction of HC and CO in an exhaust system is not inhibited.

In order to make possible more effective air pollution control, an exhaust system of an engine according to the present invention may be provided with an oxidation catalyst, a reduction catalyst or a thermal reactor, or the combination of a three-way catalyst functioning to decrease the emission levels of HC, CO and NOx and an air-fuel ratio controlling device which is arranged to control the air-fuel ratio of the air-fuel mixture inducted into the combustion chamber in accordance with the condition of the exhaust gases.

What is claimed is:

1. A method of reducing the level of nitrogen oxide emission ($NO_x$) in the exhaust during operation of a multi-cylinder, spark-ignition, automotive internal combustion engine having a plurality of cylinder bores, in each of which a combustion chamber is defined by a cylinder head and a piston crown, comprising the steps of:

supplying air and fuel comprising gasoline to the combustion chambers at an air-fuel ratio within the range of from about 13:1 to 16:1 to form a combustible air-fuel mixture therein;

recirculating exhaust gases from the engine combustion chambers back to said combustion chambers as a function of the operating conditions of the engine, wherein the amount of exhaust gases recirculated is from about 25 to 40% of the air supplied to each combustion chamber under engine operating conditions of maximum exhaust gas recirculation;

igniting the air-fuel mixture containing the recirculated exhaust gases at a plurality of points in each combustion chamber by a plurality of spark plugs, whereby the air-fuel mixture with exhaust gases therein burn at a rate effective to maintain stable operation of the engine and to maintain the level of nitrogen oxide emissions low with improved fuel economy in comparison with operation of a similar engine with a single spark plug.

2. The method as defined by claim 1, wherein the ignition step comprises igniting the air-fuel mixture containing the recirculated exhaust gases by two spaced spark plugs.

3. The method as defined by claim 2, wherein the ignition step comprises igniting the air-fuel mixture containing the recirculated exhaust gases simultaneously by two spaced spark plugs.

4. The method as defined by claim 1, further comprising the step of after-burning, in a thermal reaction chamber separate from the combustion chamber, exhaust gases produced by combustion of the air-fuel mixture after the ignition step.

5. The method as defined by claim 4, further comprising a step of maintaining the temperature of the exhaust gases produced by combustion of the air-fuel mixture at a high level to assist the afterburning of the exhaust gases.

6. The method as defined by claim 1, wherein the piston crown has a non-convex shape and wherein the combustion chamber has a shape fundamentally of a body of rotation, the axis of which corresponds with the longitudinal axis of the cylinder bore.

7. The method as defined by claim 2, wherein the midpoints of the spark gaps define an angle of from about 140° to 180° about the longitudinal axis of the cylinder bore, and the distance between the midpoints is within the range of from about 0.3 to 1.0 times the diameter of the cylinder bore.

8. The method as defined by claim 2, wherein said two spark plugs are located so that the midpoints of the spark gaps thereof are spaced apart from each other and lie generally opposite to each other across the longitudinal axis of the cylinder bore.

9. The method as defined by claim 2, wherein the distance between said midpoints is about 0.5 times the diameter of the cylinder bore.

10. The method as defined by claim 1, further comprising the step of purifying the exhaust gases discharged from the combustion in the engine.

11. The method as defined by claim 10, wherein said purifying step comprises supplying secondary air into the exhaust gases and contacting said exhaust gases with a catalyst to catalytically remove noxious constituents from the exhaust gases.

12. A multi-cylinder, spark-ignition, automotive internal combustion engine capable of stable operation with low nitrogen oxides emission levels and improved fuel economy, comprising:

(a) a plurality of cylinders, a piston reciprocably movable within each said cylinder, whereby in each cylinder the cylinder walls, the head of the piston and the cylinder head define a combustion chamber;

(b) means for supplying air and fuel comprising gasoline to the combustion chambers at an air-fuel ratio of between about 13:1 and 16:1 to form a mixture in the combustion chambers;

(c) means for recirculating to the combustion chambers exhaust gases from the engine as a function of the operating conditions of the engine within the limits of stable operation of the engine, the amount of exhaust gases recirculated being from about 25 to 40% of the air supplied to each combustion chamber under engine operating conditions of maximum exhaust gas recirculation; and (d) a plurality of spark plugs disposed within each combustion chamber for igniting the air-fuel mixture containing the recirculated exhaust gases at points and propagating flame fronts, whereby stable operation, low nitrogen oxide emission levels and enhanced fuel economy are achieved.

13. The engine as defined by claim 12, wherein the top portion of the combustion chamber defined by the inner surface of the cylinder head is fundamentally the shape of a body of rotation rotated about the longitudinal axis of the combustion chamber as the axis of rotation.

14. The engine as defined by claim 12, wherein said plurality of spark plugs comprise two spark plugs disposed through the cylinder head and extending into the combustion chamber, said spark plugs being located spaced apart from each other.

15. The engine as defined by claim 14, wherein the minimum distance of each said spark plug from the longitudinal axis of cylinder is in the range of from 0.3 to 1.0 times the radius of the cylinder.

16. The engine as defined by claim 15, wherein the location of said two spark plugs forms an angle ranging from about 140° to 180° with respect to the longitudinal axis of the combustion chamber.

17. The engine as defined by the claim 16, wherein said two spark plugs are opposed to each other with respect to the longitudinal axis of the cylinder and located substantially equidistant from the center axis of the cylinder.

18. The engine as defined by claim 12, wherein the engine comprises an even number of cylinders.

19. The engine as defined by claim 18, wherein the two exhaust ports of two neighboring cylinders are siamesed with each other to form siamesed exhaust ports.

20. The engine as defined by claim 19, wherein each of the siamesed exhaust ports is lined with a port liner for prevention of a temperature drop of the exhaust gases passing therethrough.

21. The engine as defined by claim 19, wherein the cylinder head is formed with a cross-flow induction-exhaust construction.

22. The engine as defined by claim 21, wherein the centers of portions of the intake and exhaust ports opening to each combustion chamber are disposed in different directions to each other with respect to and far from the axis passing through the center of the cylinder and intersecting at right angles to the longitudinal axis of the cylinder head.

23. The engine as defined by claim 19, further comprising means connected to the exhaust ports for afterburning the exhaust gases discharged from the combustion chambers of the engine.

24. The engine as defined by claim 23, wherein said afterburning means includes a thermal reactor.

25. The engine as defined by claim 23, wherein said afterburning means includes a catalytic converter for catalytically removing noxious constituents from the exhaust gases.

26. The engine as defined by claim 14, further comprising means for setting the spark timing of said two spark plugs at the same time.

27. The engine as defined by claim 13, wherein the shape of the piston head is generally flat or concave.

28. The engine as defined by claim 27, wherein the shape of a portion of said cylinder head defining the combustion chamber is generally concave or flat.

29. The engine as defined by claim 28, wherein the combustion chamber is of a hemispherical type.

30. The engine as defined by claim 28, wherein the combustion chamber is of a pancake type.

31. The engine as defined by claim 28, wherein the combustion chamber is of a heron type.

32. The engine as defined by claim 13, further comprising means for purifying the exhaust gases discharged from the combustion chamber of the engine, said exhaust gas purifying means including means for supplying secondary air into the exhaust gases discharged from the combustion chamber.

33. The engine as defined by claim 29, further comprising means for setting the spark timing of said two spark plugs at the same time, in which said two spark plugs are located such that the midpoints of the spark gaps thereof lie generally symmetrical to each other about the longitudinal axis of the cylinder bore, the distance between the midpoints of the spark gaps of said two spark plugs being 0.5 times the diameter of the cylinder bore.

34. The engine as defined by claim 12, further comprising air-fuel intake means located in said cylinder head for inducting the air-fuel mixture into the combustion chamber generally tangentially with respect to the inner wall of the engine cylinder and generally parallel to the piston head surface, whereby a strong swirl of the air-fuel mixture is formed in the combustion chamber to enhance the combustion time shortening effect, said intake means comprising an elongated intake port formed in said cylinder head, said intake port communicating with the combustion chamber through an intake valve having a valve head associated with a valve seat, said intake port comprising a portion wherein (1) the longitudinal center axis thereof lying on a first plane which is substantially parallel to a line substantially perpendicular to the cylinder bore center axis and passes through an opening formed by the inner peripheral surface of the valve seat and is inclined with respect to a second plane which is perpendicular to the cylinder bore center axis at an angle $\alpha_1$ which is smaller than the angle $\alpha_2$ which is formed between said second and a flat plane containing a line connecting center of the piston head at a top dead center and the center of the inner aperture defined by the inner edge of the valve seat, the flat plane being substantially parallel to said line substantially perpendicular to the cylinder bore center axis, and (2) the longitudinal center axis thereof is curved such that a plane, which is (a) tangent to said longitudinal center axis at the center of the outer aperture defined by the outer edge of the valve seat and (b) substantially parallel to the cylinder bore center axis, is spaced apart from the cylinder bore center axis.

35. A method of reducing the level of nitrogen oxide emissions ($NO_x$) in the exhaust during operation of a multi-cylinder, spark-ignition, automative internal combustion engine having a plurality of cylinder bores in each of which a combustion chamber having a plurality of spark plugs is defined by a cylinder head and a piston crown, comprising the steps of:

supplying air and fuel comprising gasoline to the combustion chambers at an air-fuel ratio within the range from about 13:1 to 16:1 to form a combustible air-fuel mixture therein;

recirculating exhaust gases from the engine combustion chambers back to said combustion chambers at a rate which varies as a function of engine operating conditions and which, as a percentage by volume of the air supplied to each combustion chamber, varies up to a maximum rate of about 50% and which is greater, under substantially all engine operating conditions, than a rate defined by an upper limit of stable operation under corresponding engine operating conditions of an engine, corresponding in structure to said engine having a plurality of spark plugs, but having only a single spark plug; and igniting the air-fuel mixture containing the recirculated exhaust gases at a plurality of points in each combustion chamber by said plurality of spark plugs, whereby the air-fuel mixture with exhaust gases therein burns at a rate effective to maintain stable operation of the engine while maintaining the level of nitrogen oxide emissions low with improved fuel economy relative to said corresponding engine having a single spark plug.

* * * * *

UNITED STATES PATENT AND TRADEMARK OFFICE
CERTIFICATE OF CORRECTION

PATENT NO. : 4,459,804
DATED : July 17, 1984
INVENTOR(S) : Yasuo NAKAJIMA, Yoshimasa HAYASHI and Tooru YOSHIMURA It is certified that error appears in the above—identified patent and that said Letters Patent is hereby corrected as shown below:

IN THE BIBLIOGRAPHICAL DATA:

At item [30] "FOREIGN APPLICATION PRIORITY DATA" kindly add
-- May 27, 1975 [JP] Japan .......50-63726 --

Column 5, "$oP_i =$" should read -- $\sigma P_i =$ --.
Column 7, line 13, kindly delete "a" and insert instead -- of --.

*Signed and Sealed this*

*Twenty-ninth* Day of *January 1985*

[SEAL]

Attest:

DONALD J. QUIGG

Attesting Officer     Acting Commissioner of Patents and Trademarks